United States Patent
Sugiura et al.

(10) Patent No.: US 10,663,904 B2
(45) Date of Patent: May 26, 2020

(54) IMAGE FORMING APPARATUS

(71) Applicant: CANON KABUSHIKI KAISHA, Tokyo (JP)

(72) Inventors: Tadao Sugiura, Moriya (JP); Shun Motohashi, Misato (JP)

(73) Assignee: Canon Kabushiki Kaisha, Tokyo (JP)

( * ) Notice: Subject to any disclaimer, the term of this patent is extended or adjusted under 35 U.S.C. 154(b) by 143 days.

(21) Appl. No.: 16/043,777

(22) Filed: Jul. 24, 2018

(65) Prior Publication Data
US 2019/0049890 A1    Feb. 14, 2019

(30) Foreign Application Priority Data
Aug. 9, 2017   (JP) .................. 2017-154455

(51) Int. Cl.
G03G 15/00   (2006.01)
G03G 15/04   (2006.01)
G06F 3/041   (2006.01)
G03G 15/20   (2006.01)

(52) U.S. Cl.
CPC ... *G03G 15/6511* (2013.01); *G03G 15/04072* (2013.01); *G03G 15/2064* (2013.01); *G03G 15/5016* (2013.01); *G03G 15/5029* (2013.01); *G03G 15/55* (2013.01); *G06F 3/0412* (2013.01)

(58) Field of Classification Search
CPC ................................ G03G 15/6511
USPC ....................................... 399/389
See application file for complete search history.

(56) References Cited

U.S. PATENT DOCUMENTS

| | | | | |
|---|---|---|---|---|
| 5,722,029 A | * | 2/1998 | Tomidokoro | G03G 15/5029 271/9.06 |
| 5,927,707 A | * | 7/1999 | Miura | B65H 1/266 271/171 |
| 7,464,922 B2 | * | 12/2008 | Kozaki | B65H 3/0669 271/118 |
| 9,475,663 B2 | * | 10/2016 | Takata | B65H 7/20 |
| 2005/0074266 A1 | * | 4/2005 | Hiramoto | B65H 3/44 399/391 |

FOREIGN PATENT DOCUMENTS

| | | |
|---|---|---|
| JP | 7-112844 A | 5/1995 |
| JP | 2015139931 A | 8/2015 |

* cited by examiner

*Primary Examiner* — Anthony H Nguyen
(74) *Attorney, Agent, or Firm* — Canon U.S.A., Inc. IP Division

(57) ABSTRACT

An image forming apparatus includes a trailing edge regulation guide configured to regulate a trailing edge position of a sheet stored in a sheet storage unit, a detection unit configured to detect a position of the trailing edge regulation guide, an input unit configured to input a sheet size to be set for the sheet storage unit, and a control unit. In the sheet storage unit, an attachment is attachable to the trailing edge regulation guide. The control unit controls display a warning screen in a case where a length in a feeding direction in the sheet size input by the input unit is longer than a predetermined length, whereas the control unit does not to display the warning screen according to the position of the trailing edge regulation guide in a case where the length in the feeding direction is shorter than the predetermined length.

10 Claims, 12 Drawing Sheets

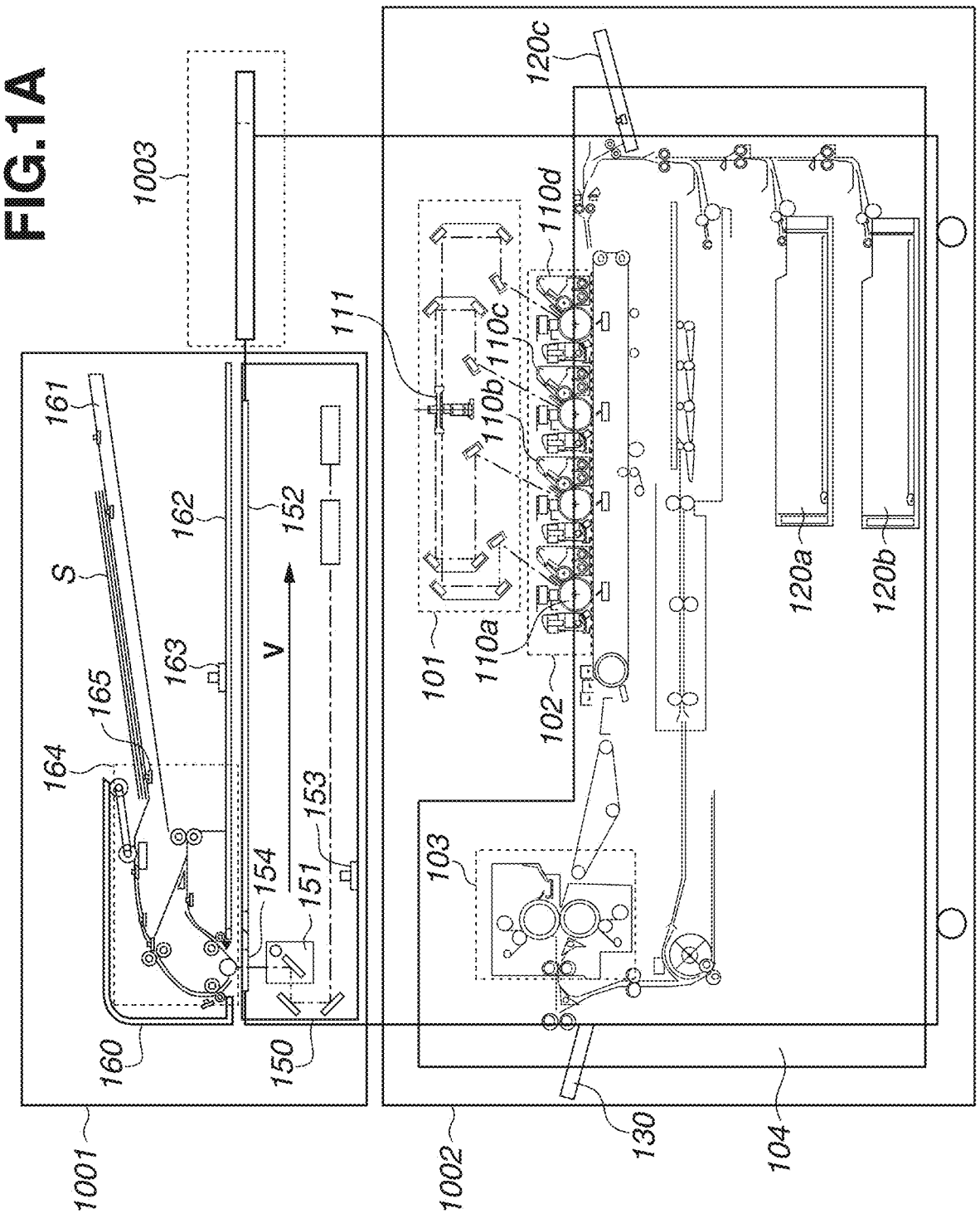

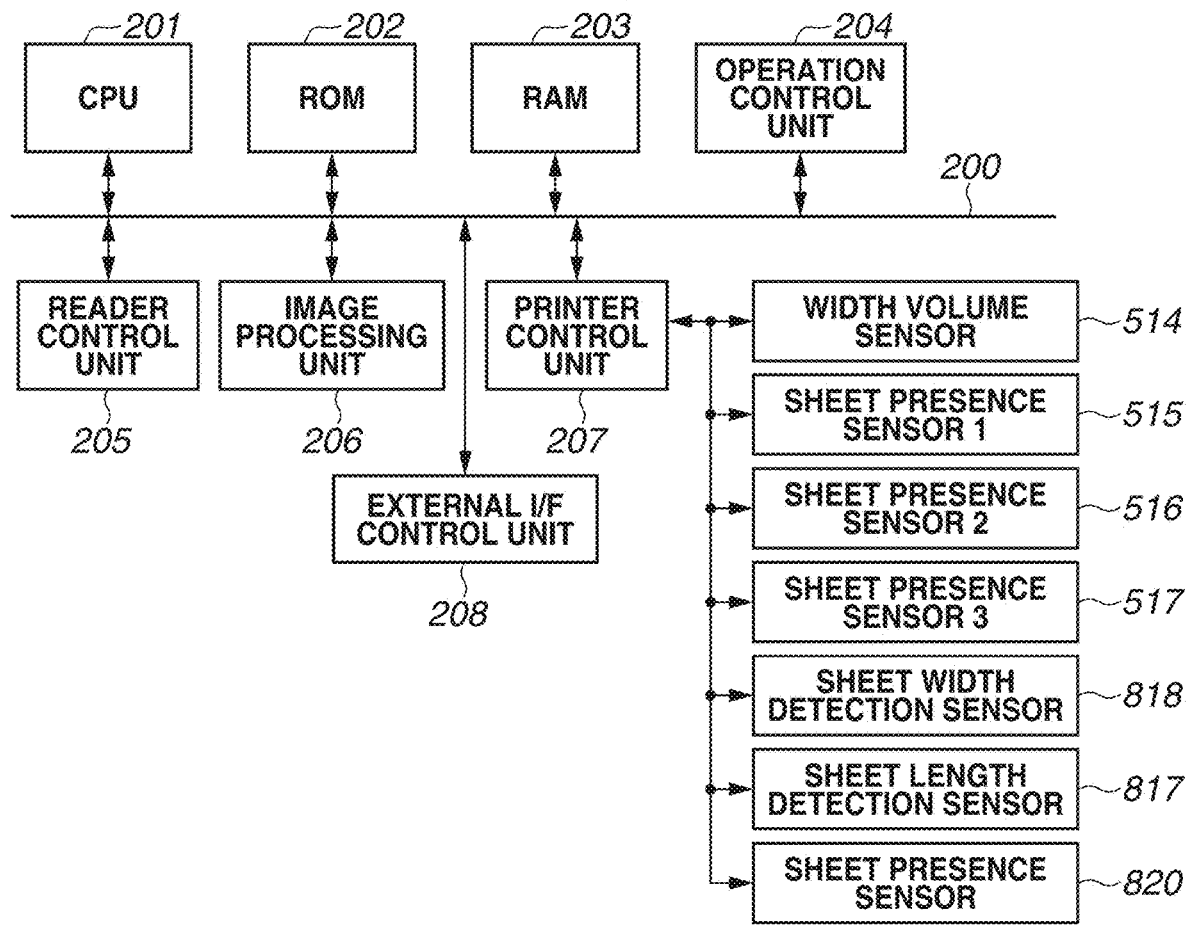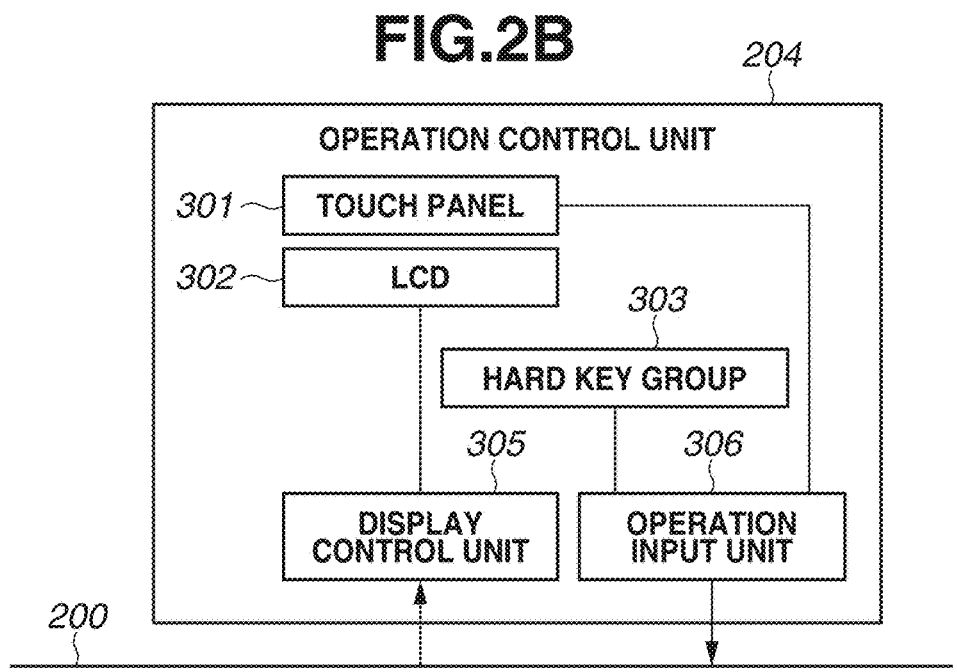

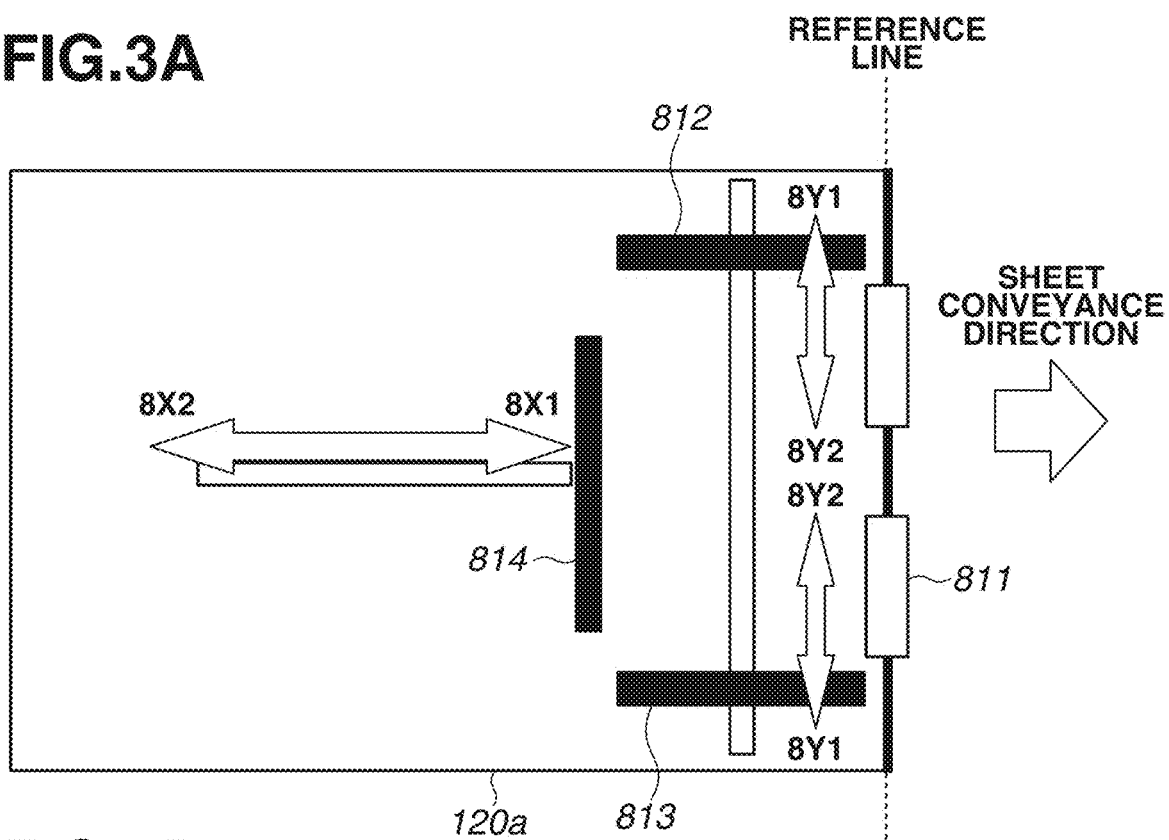
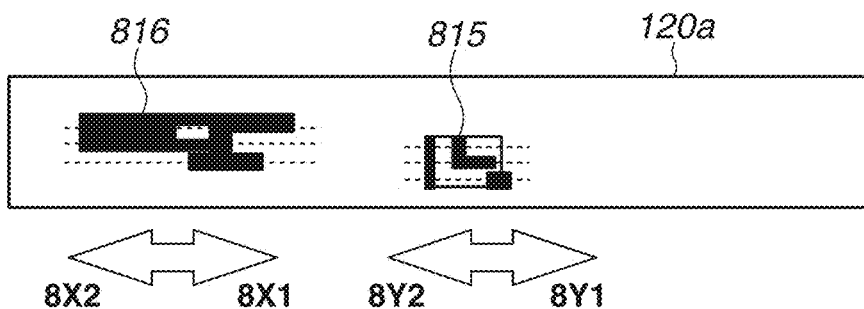
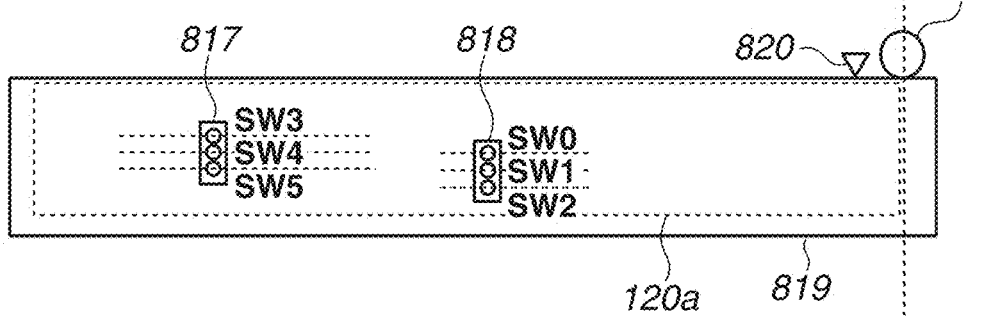

FIG.5A

| RESULT OF DETECTING CASSETTE SHEET LENGTH (mm) | SW3 | SW4 | SW5 | USER-SET SIZE (SHEET LENGTH) | | | | | | | | | | |
|---|---|---|---|---|---|---|---|---|---|---|---|---|---|---|
| | | | | – 190.4 | – 211.5 | – 221.5 | – 252.0 | – 262.0 | – 267.5 | – 277.5 | – 281.5 | – 290.9 | – 298.5 | – 308.5 | – 355.6 |
| 190.5 – 221.5 | OFF | ON | ON | ○ | ○ | ○ | SETTING ERROR | SETTING ERROR | SETTING ERROR | SETTING ERROR | SETTING ERROR | SETTING ERROR | SETTING ERROR | SETTING ERROR | SETTING ERROR |
| 221.6 – 262.0 | OFF | ON | OFF | ○ | ○ | ○ | ○ | ○ | SETTING ERROR | SETTING ERROR | SETTING ERROR | SETTING ERROR | SETTING ERROR | SETTING ERROR | SETTING ERROR |
| 262.1 – 277.5 | OFF | OFF | OFF | ○ | SETTING ERROR | SETTING ERROR | ○ | ○ | ○ | ○ | SETTING ERROR | SETTING ERROR | SETTING ERROR | SETTING ERROR | SETTING ERROR |
| 277.6 – 281.5 | OFF | OFF | ON | ○ | SETTING ERROR | SETTING ERROR | SETTING ERROR | SETTING ERROR | SETTING ERROR | ○ | ○ | SETTING ERROR | SETTING ERROR | SETTING ERROR | SETTING ERROR |
| 281.6 – 290.9 | OFF | ON | OFF | ○ | SETTING ERROR | SETTING ERROR | SETTING ERROR | SETTING ERROR | SETTING ERROR | SETTING ERROR | ○ | ○ | SETTING ERROR | SETTING ERROR | SETTING ERROR |
| 291.0 – 308.5 | ON | OFF | OFF | ○ | SETTING ERROR | SETTING ERROR | SETTING ERROR | SETTING ERROR | SETTING ERROR | SETTING ERROR | SETTING ERROR | SETTING ERROR | ○ | ○ | SETTING ERROR |
| 308.6 – | ON | ON | OFF | ○ | SETTING ERROR | SETTING ERROR | SETTING ERROR | SETTING ERROR | SETTING ERROR | SETTING ERROR | SETTING ERROR | SETTING ERROR | SETTING ERROR | ○ | ○ |

FIG.5B

| RESULT OF DETECTING CASSETTE SHEET WIDTH (mm) | SW0 | SW1 | SW2 | USER-SET SIZE (SHEET WIDTH) | | | | | | | |
|---|---|---|---|---|---|---|---|---|---|---|---|
| | | | | ~129.7 | ~139.7 | ~172.0 | ~182.0 | ~185.0 | ~195.0 | ~206.0 | ~216.0 |
| ~98.4 | ON | OFF | ON | ○ | ○ | SETTING ERROR | SETTING ERROR | SETTING ERROR | SETTING ERROR | SETTING ERROR | SETTING ERROR |
| 98.5 ~ 139.7 | ON | OFF | OFF | SETTING ERROR | ○ | ○ | SETTING ERROR | SETTING ERROR | SETTING ERROR | SETTING ERROR | SETTING ERROR |
| 139.8 ~ 182.0 | ON | ON | OFF | SETTING ERROR | SETTING ERROR | SETTING ERROR | ○ | ○ | SETTING ERROR | SETTING ERROR | SETTING ERROR |
| 182.1 ~ 195.0 | ON | ON | ON | SETTING ERROR | SETTING ERROR | SETTING ERROR | SETTING ERROR | SETTING ERROR | ○ | ○ | SETTING ERROR |
| 195.1 ~ | OFF | ON | ON | SETTING ERROR | SETTING ERROR | SETTING ERROR | SETTING ERROR | SETTING ERROR | SETTING ERROR | SETTING ERROR | ○ |

FIG.6
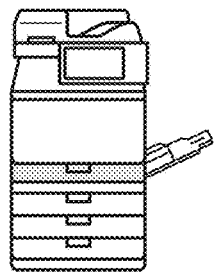 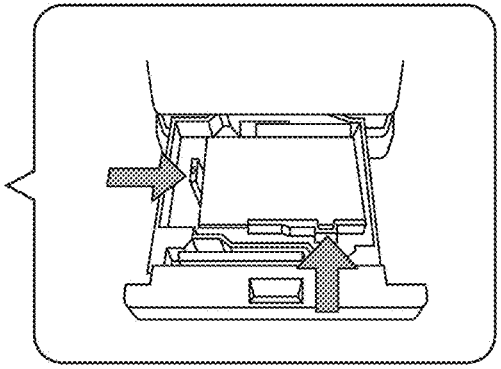

IMAGE FORMING APPARATUS

BACKGROUND OF THE INVENTION

Field of the Invention

The present disclosure relates to an image forming apparatus.

Description of the Related Art

In general, an image forming apparatus such as a copier or printer includes a sheet feeding cassette for storing sheets. The sheet feeding cassette is configured to be capable of storing sheets of various sizes, such as the A series of sheet sizes (A3, A4, and A5), the B series of sheet sizes (B4 and B5), and the inch-based sheet sizes (LGL and LTR). In addition, the size information of the currently stored sheets is set for the sheet feeding cassette beforehand. This prevents occurrence of erroneous operations of feeding a sheet of wrong size and performing image formation on this sheet.

The following conventional method has been discussed as a method for setting sheet size information. Japanese Patent Application Laid-Open No. 7-112844 discusses a method for automatically setting a sheet size, by detecting the position of each of a trailing-edge guide and a side guide provided in a cassette. The trailing-edge guide regulates the position of the trailing edge of a sheet, and the side guide regulates the position of the side edge of the sheet. Other than this method, a method for setting sheet size information (a user-set size) input by a user using an operation unit to a sheet feeding cassette is also known in general.

In a case that the trailing-edge guide and the side guide are not appropriately set at the respective positions for abutting the trailing edge and the side edge of a sheet, in reaction to feeding of a sheet, other sheets may move in the direction opposite to the feeding direction of the sheet, or may be skewed during feeding. To address such situations, Japanese Patent Application Laid-Open No. 2015-139931 discusses a method for displaying a warning screen, in a case where the position of a guide is determined to not coincide with a user-set size.

There is a case where an auxiliary member (attachment) is attached to a trailing-edge guide when, for example, sheets of small size are stored in a sheet feeding cassette. The auxiliary member (attachment) is provided as an accessory attachable to the sheet feeding cassette. The auxiliary member regulates the position of the trailing edge of a sheet at a position downstream of the trailing-edge guide in a conveyance direction.

In the sheet feeding cassette to which the auxiliary member is attached, the warning screen as described above is displayed if it is determined that there is a mismatch between the user-set size and a sheet size automatically detected from the position of the trailing-edge guide. Such a warning screen displayed even in the foregoing case may be inconvenient for some users.

SUMMARY OF THE INVENTION

The present disclosure is directed to providing a way of appropriately displaying a warning in an image forming apparatus having a sheet storage unit in which an auxiliary member is attachable to a trailing-edge guide.

According to an aspect of the present invention, an image forming apparatus includes a storage unit configured to store a sheet, an image forming unit configured to form an image on a sheet fed from the storage unit, a trailing edge regulation member provided in the storage unit, wherein the trailing edge regulation member is slidable in a feeding direction of a sheet and configured to regulate a position of a trailing edge of the sheet in the feeding direction, an attachment configured to be attached to the trailing edge regulation member, wherein the attachment is configured to regulate a position of a trailing edge of a sheet at a position downstream of the trailing edge regulation member in the feeding direction, a detection unit configured to detect a size of a sheet stored in the storage unit based on a position of the trailing edge regulation member, an input unit configured to input a size of a sheet to be set for the storage unit based on a user instruction, and a control unit configured to perform a first determination process to determine whether the size of the sheet input by the input unit corresponds to the size of the sheet detected by the detection unit and perform a second determination process to determine whether a length in the feeding direction in the size of the sheet input by the input unit is longer or shorter than a predetermined length, wherein, in a case where the control unit determines in the second determination process that the length in the feeding direction in the size of the sheet input by the input unit is longer than the predetermined length, the control unit performs control to display on a display unit a warning screen based on a result of the first determination process, and wherein, in a case where the control unit determines in the second determination process that the length in the feeding direction in the size of the sheet input by the input unit is shorter than the predetermined length, the control unit performs control to prevent display on the display unit of the warning screen based on a result of the first determination process.

Further features of the present invention will become apparent from the following description of embodiments with reference to the attached drawings.

BRIEF DESCRIPTION OF THE DRAWINGS

FIGS. 1A and 1B are diagrams illustrating a cross section of an image forming apparatus and an operation unit, respectively.

FIGS. 2A and 2B are control block diagrams of the image forming apparatus.

FIGS. 3A, 3B, and 3C are configuration diagrams of a sheet feeding cassette.

FIGS. 5A and 5B each illustrate a table indicating a relationship between sheet-size detection result and user-set size.

FIG. 6 is a diagram illustrating a warning screen.

DESCRIPTION OF THE EMBODIMENTS

Figure 1B:
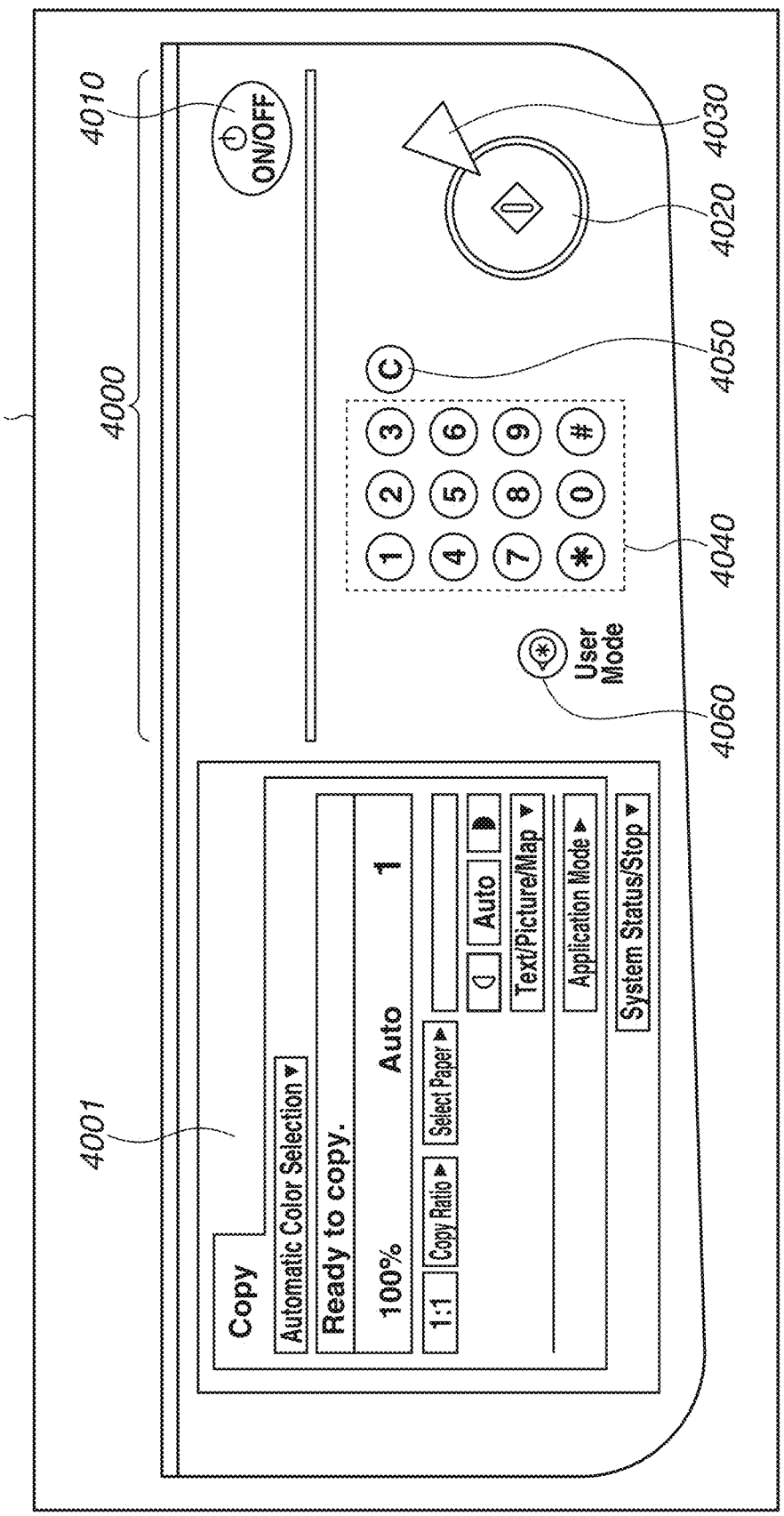

A first embodiment will be described below with reference to the drawings. FIG. 1A is a cross-sectional diagram illustrating a schematic configuration of a full color copier that is an example of an image forming apparatus, and FIG.

1B is a diagram illustrating an operation unit of the image forming apparatus. The image forming apparatus illustrated in FIGS. 1A and 1B includes a reader unit 1001, a printer unit 1002, and an operation unit 1003. The reader unit 1001 includes an image reader 150. The reader unit 1001 optically reads an image on a document and converts the read image into an electric signal to generate image data. The reader unit 1001 includes an automatic document feeder (ADF) 160. The reader unit 1001 conveys documents S stacked on a document tray 161 one by one to a document flow reading glass 154 using a conveyance unit 164 indicated with a dash line in FIG. 1A. Subsequently, an optical scanner unit 151 located below the document flow reading glass 154 reads an image on the document conveyed onto the document flow reading glass 154. After being read by the optical scanner unit 151, the document is discharged onto a document discharge tray 162 by the conveyance unit 164. A discharged-document detection sensor 163 detects presence or absence of the document discharged onto the document discharge tray 162. Further, a document presence detection sensor 165 detects whether the documents S are stacked on the document tray 161.

The printer unit 1002 includes a laser exposure unit 101, an image forming unit 102, and a fixing unit 103, which are each indicated with a dash-line frame. The printer unit 1002 further includes a sheet feeding/conveyance unit 104 (in a solid-line frame) including sheet feeding cassettes 120a and 120b as well as a manual feeding tray 120c. The sheet feeding cassettes 120a and 120b as well as the manual feeding tray 120c are sheet storage units for storing sheets of a plurality of sizes. The image forming unit 102 includes photosensitive drums 110a, 110b, 110c, and 110d (hereinafter expressed as the photosensitive drums 110a to 110d). The laser exposure unit 101 makes a laser beam modulated according to image data incident on a rotatable polygon mirror 111 that rotates at a constant angle velocity and then emits the incident beam, as a reflection scanning beam indicated with a dashed-dotted line in FIG. 1A, onto the photosensitive drums 110a to 110d to form a latent image thereon. The image forming unit 102 drives the photosensitive drums 110a to 110d to rotate and charges each of the photosensitive drums 110a to 110d using a charger. Further, the image forming unit 102 develops, using toner, the latent image formed on each of the photosensitive drums 110a to 110d by the laser exposure unit 101 and transfers the toner images to a sheet fed from the sheet storage unit. The four photosensitive drums 110a to 110d are arranged for forming images of yellow (Y), magenta (M), cyan (C), and black (K), respectively, in this order. The photosensitive drums 110a to 110d sequentially perform image forming operation after a lapse of a predetermined time from the start of image formation. Based on this timing control, the toner images of the respective colors are transferred onto the sheet in a superimposed manner to form a full-color toner image. The fixing unit 103 includes a combination of a roller and a belt. The fixing unit 103 further includes a heat source such as a halogen heater. The fixing unit 103 melts and fixes the full-color toner image, which is formed by the image forming unit 102 and unfixed on the sheet, by heat and pressure.

The sheet feeding/conveyance unit 104 separates each of sheets stored in any of the storage units including the sheet feeding cassettes 120a and 120b and the manual feeding tray 120c, and conveys the separated sheet to the image forming unit 102. As described above, the toner image of each color is transferred onto the sheet conveyed to the image forming unit 102, fixed by the fixing unit 103 and then discharged to a sheet discharge tray 130.

The operation unit 1003 has a key input unit 4000 and a touch panel unit 4001. A user operates the key input unit 4000 by touching keys. A power supply switch 4010 is provided to switch between supply and cut-off of power of the entire image forming apparatus. A start key 4020 is provided to start execution of a copy job for performing document reading operation and printing operation. A stop key 4030 is provided to stop the copy job. A keypad 4040 indicated with a dash line frame includes keys for setting the number of copies to be made. A clear key 4050 is provided to return the settings of a copy mode to default values. A user mode key 4060 is provided to transition to a screen for performing system settings and various adjustments. The touch panel unit 4001 allows the user to input information by touching a touch panel 301. The touch panel unit 4001 also functions as a display unit for displaying information. The touch panel unit 4001 displays information such as the number of copies, a magnification, and a copy density.

Control Block

FIG. 2A is a control block diagram of the image forming apparatus according to the present embodiment. In the image forming apparatus, a central processing unit (CPU) 201, a read only memory (ROM) 202, a random access memory (RAM) 203, an operation control unit 204, a reader control unit 205, an image processing unit 206, an external interface (I/F) control unit 208, and a printer control unit 207 are connected to one another via a system bus 200. The CPU 201 is a control unit for controlling the image forming apparatus. A program for executing a flowchart to be described below is written in the ROM 202. The CPU 201 provides various functions by executing this program. The RAM 203 is used as a work memory for the CPU 201 to perform various kinds of arithmetic processing. The operation control unit 204 is an electric circuit for controlling each component of the operation unit 1003. The reader control unit 205 is an electric circuit including an input/output (I/O) port for controlling each component of the reader unit 1001, and the printer control unit 207 is an electric circuit including an input/output (I/O) port for controlling each component of the printer unit 1002. The printer control unit 207 controls detection units such as a width volume sensor 514, sheet presence sensors 515, 516, and 517, a sheet width detection sensor 818, a sheet length detection sensor 817, and a sheet presence sensor 820. The printer control unit 207 further includes each drive circuit of a pickup roller 811 illustrated in FIG. 3. The CPU 201 performs image forming operation by controlling the reader control unit 205 and the printer control unit 207 according to the program stored in the ROM 202.

The image processing unit 206 performs various kinds of image processing on digital data of a document image converted by the reader control unit 205 and then outputs the data, which has undergone the image processing, to the printer control unit 207. The external I/F control unit 208 is an electric circuit for connecting the image forming apparatus to an external apparatus, such as a server and a personal computer, via a local area network (LAN) cable or a Universal Serial Bus (USB) cable, and controlling communication with the external apparatus.

Block Diagram of Operation Control Unit

FIG. 2B is a block diagram illustrating details of the operation control unit 204. The touch panel 301 and a hard key group 303 (corresponding to the keys 4020 to 4060 illustrated in FIG. 1B) are connected to the system bus 200 via an operation input unit 306. Coordinate information indicating a pressed position of the touch panel 301 and key information corresponding to pressing of the hard key group 303 are output to the system bus 200 via the operation input unit 306. A liquid crystal display (LCD) 302 is connected to the system bus 200 via a display control unit 305. The display control unit 305 and the operation input unit 306 are connected to the CPU 201, the ROM 202, and the RAM 203 via the system bus 200. The ROM 202 stores data such as data of a screen for setting various operation modes and data of display keys, in addition to the control program. The RAM 203 stores the current setting status of the image forming apparatus. When the coordinate information and the key information are input from the operation input unit 306, the CPU 201 operates as follows. First, the CPU 201 selects a setting screen and a display key according to the current setting status of the image forming apparatus and an operation performed by the user on the touch panel 301 or the hard key group 303. The CPU 201 then transfers the selected setting screen and display key to the display control unit 305, as display data. The display control unit 305 transmits the display data, which is transferred by the CPU 201, to the LCD 302. The LCD 302 then visibly displays the received display data.

Configuration of Sheet Feeding Cassette

A configuration of the sheet feeding cassette 120a, which is an example of the storage unit according to the present embodiment, will be described with reference to FIGS. 3A, 3B, and 3C. FIG. 3A is a top perspective view of the sheet feeding cassette 120a when the front side of the image forming apparatus is on the lower side in the figure. FIG. 3B is a rear side view of the sheet feeding cassette 120a in a case where the sheet feeding cassette 120a is virtually seen through from the front side of the image forming apparatus. FIG. 3C is a front view of the sheet feeding cassette 120a in a state of being attached to the image forming apparatus.

Sheets can be supplied to the sheet feeding cassette 120a in a state where the sheet feeding cassette 120a is drawn out from a main body 819 on the image forming apparatus side. The printing operation can be performed in a state where the sheet feeding cassette 120a is housed in the main body 819 on the image forming apparatus side.

A plurality of sheets can be stacked in the sheet feeding cassette 120a. The pickup roller 811 provided near the main body 819 sequentially feeds the sheets to the image forming unit 102, starting from the uppermost sheet.

Side regulation guides 812 and 813 are each provided slidably in a direction indicated with arrows 8Y1 and 8Y2, which is a width direction orthogonal to the feeding direction of a sheet. The side regulation guides 812 and 813 regulate the side edges of the stacked sheets in the widthwise direction, and prevent the sheet from being fed while being skewed. Further, the side regulation guides 812 and 813 are connected to a sheet width detection plate 815 illustrated in FIG. 3B, via a link mechanism (not illustrated). As the side regulation guides 812 and 813 move, the sheet width detection plate 815 also slides in the direction indicated with the arrows 8Y1 and 8Y2, which is the direction orthogonal to the feeding direction of the sheet. In the present embodiment, the side regulation guides 812 and 813 can regulate a sheet having a sheet width of 98.5 mm to 215.0 mm.

A trailing edge regulation guide 814 is configured to be slidable in a direction indicated with arrows 8X1 and 8X2, which is the feeding direction of a sheet. The trailing edge regulation guide 814 regulates the position of the trailing edge of the sheet in the feeding direction. The trailing edge regulation guide 814 thereby prevents, in reaction to the feeding of a sheet of the stacked sheets, other sheet from moving in the direction opposite to the feeding direction. Further, the trailing edge regulation guide 814 is connected to a sheet length detection plate 816 via a link mechanism (not illustrated). The sheet length detection plate 816 slides in the direction indicated with the arrows 8X1 and 8X2 in an interlocking manner, according to the position of the trailing edge regulation guide 814. In the present embodiment, the trailing edge regulation guide 814 can regulate the trailing edge of a sheet having a sheet length of 190.5 mm to 355.6 mm.

The sheet width detection sensor 818 provided in the main body 819 includes switches SW0, SW1, and SW2. The sheet width detection sensor 818 detects a sheet width in a state where the sheet feeding cassette 120a is inserted in the main body 819. Specifically, as an ON-OFF combination of the switches SW0, SW1, and SW2, the sheet width detection sensor 818 detects information representing the shape of the sheet width detection plate 815, which slides in the direction indicated with the arrows 8Y1 and 8Y2 in an interlocking manner with the side regulation guides 812 and 813, at a position indicated with a dash line in FIG. 3B.

Similarly, the sheet length detection sensor 817 provided in the main body 819 includes three switches SW3, SW4, and SW5. The sheet length detection sensor 817 detects a sheet length in a state where the sheet feeding cassette 120a is inserted in the main body 819. Specifically, as an ON-OFF combination of the switches SW3, SW4, and SW5, the sheet length detection sensor 817 detects information representing the shape of the sheet length detection plate 816, which slides in the direction indicated with the arrows 8X1 and 8X2 in an interlocking manner with the trailing edge regulation guide 814, at a position indicated with a dash line in FIG. 3B.

The sheet presence sensor 820 provided in the main body 819 detects the sheet surface of the uppermost sheet positioned on the top of a plurality of sheets stored in the sheet feeding cassette 120a. The CPU 201 drives/stops a lift-up motor (not illustrated), based on detection results of the sheet width detection sensor 818, the sheet length detection sensor 817, and the sheet presence sensor 820. This allows lift-up operation for lifting the sheets stacked in the sheet feeding cassette 120a to a height that allows the pickup roller 811 to feed paper. Subsequently, operation for determining presence or absence of sheet in the sheet feeding cassette 120a is performed in a state where the sheets are lifted to the height that allows the paper feeding.

User-Set Size

As described above, a mechanism for automatically detecting the size of sheets stored in the sheet feeding cassette is provided in the present embodiment. However, a sheet size specified by the user can also be set for the sheet feeding cassette.

Figure 4A:
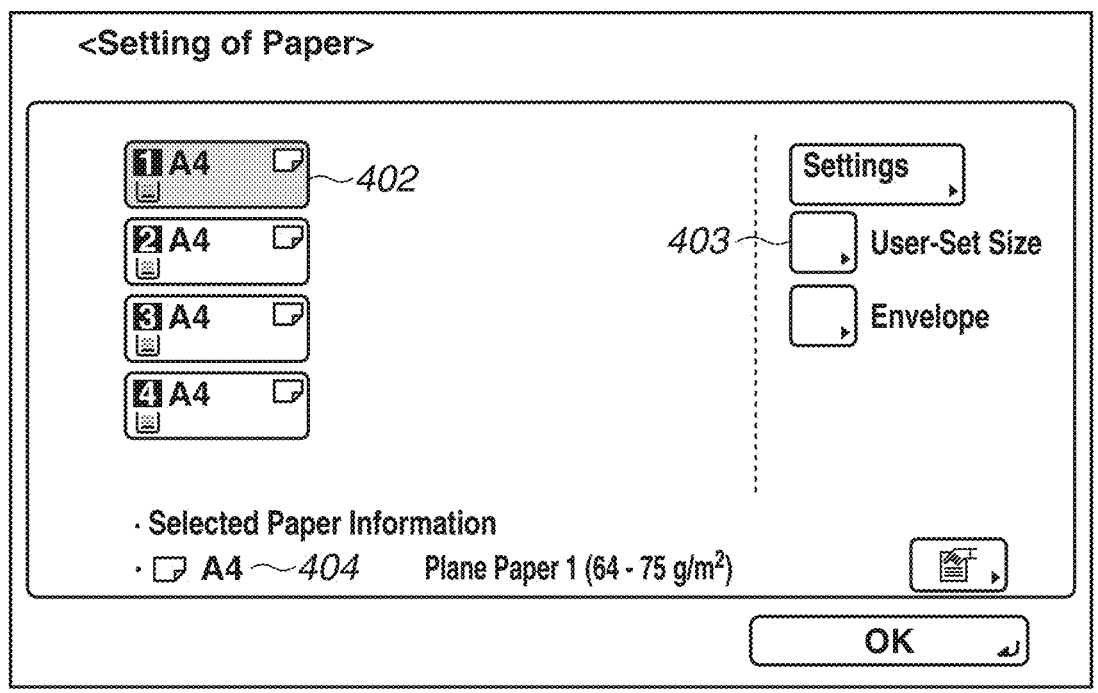
FIGS. 4A, 4B, and 4C each illustrate a screen for setting a sheet size.
Figure 4B:
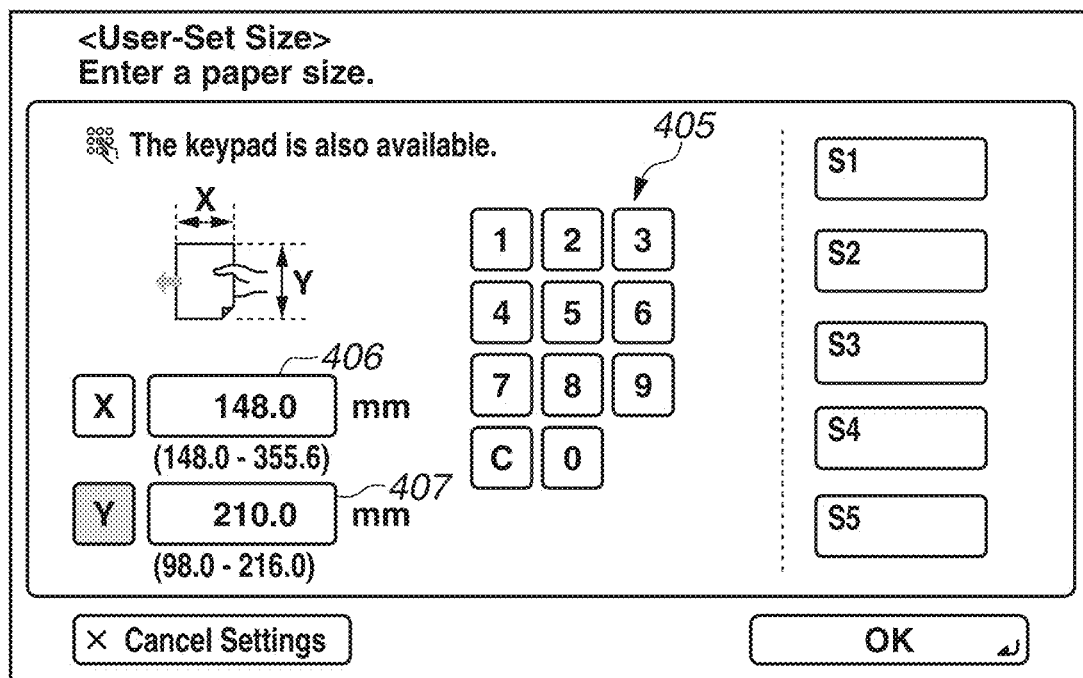
Figure 4C:
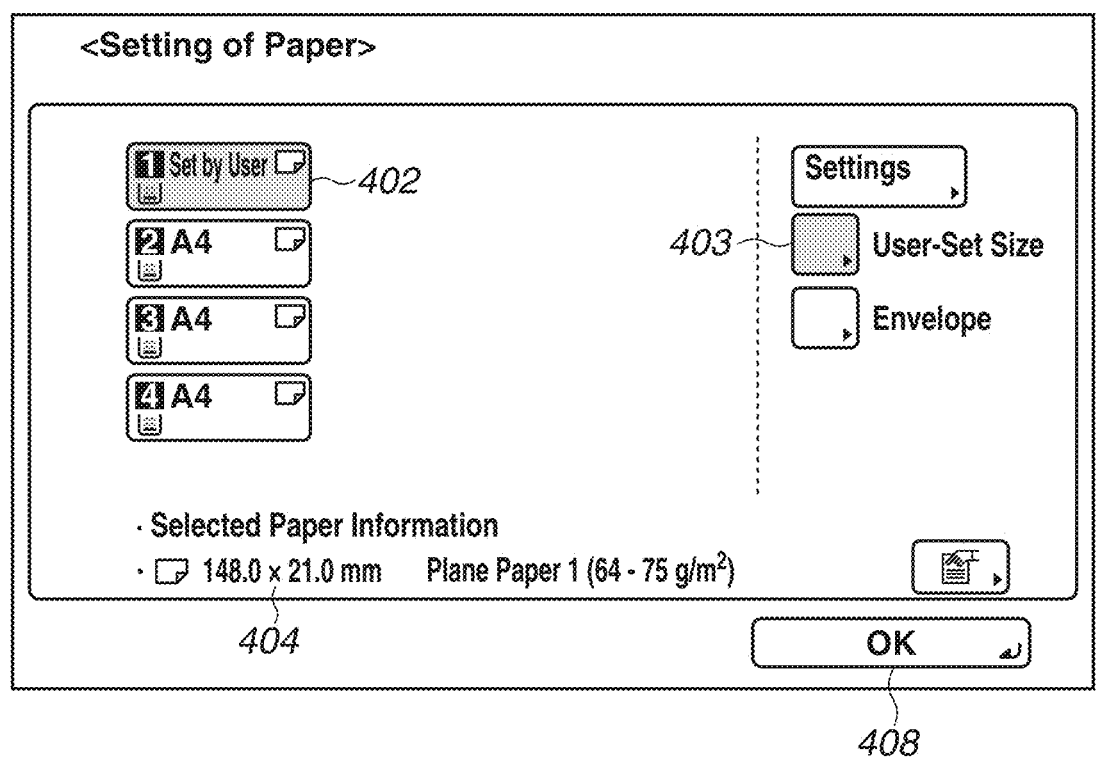

An example of setting of a sheet size according to a user instruction will be described with reference to FIGS. 4A to 4C. FIGS. 4A to 4C each illustrate a sheet-size setting screen displayed on the operation unit 1003.

In FIG. 4A, a sheet feeding cassette key 402 is provided to select a target sheet feeding cassette for which sheet-size setting is to be made. The sheet feeding cassette key 402 displays information of a sheet size registered for the target sheet feeding cassette. When the sheet feeding cassette key 402 is pressed by the user, the sheet feeding cassette corresponding to this key is selected as a target sheet feeding cassette for which sheet-size setting is to be made. In the example illustrated in FIG. 4A, the sheet feeding cassette 120a is selected as a target sheet feeding cassette for which sheet-size setting is to be made. A sheet information display area 404 is an area for displaying detailed information about a sheet set for the selected sheet feeding cassette. This area displays information indicating a sheet type and grammage, in addition to a sheet size. A user-set size key 403 is a key that allows a user to input a sheet size for the selected sheet feeding cassette. The press of this key by the user causes a transition to a user-set size screen illustrated in FIG. 4B.

FIG. 4B is a screen to be displayed in response to the press of the user-set size key 403. In FIG. 4B, a sheet size input area 406 is provided to input information indicating a length (a sheet length) in a direction (a feeding direction X) for feeding a sheet. A sheet size input area 407 is provided to input a sheet length (a sheet width) in a direction (a widthwise direction Y) orthogonal to the feeding direction. It is possible to set not only a standard size but also a nonstandard size, by inputting information indicating a sheet length and a sheet width into the sheet size input areas 406 and 407, respectively. The user specifies a sheet size in each of the feeding direction X and the widthwise direction Y, using the keypad 4040 or a soft keyboard 405 illustrated in FIG. 4B. An OK key 408 is provided to determine the specified sheet size. In response to pressing of the OK key 408, the CPU 201 sets the sheet size input in the user-set size screen for the target sheet feeding cassette and then displays information indicating the sheet size in the sheet information display area 404 as illustrated in FIG. 4C.

Sheet Size Detection of Sheet Feeding Cassette

Next, processing for determining a match/nonmatch between the sheet size (the user-set size) specified by the user and the automatically detected sheet size will be described. FIG. 5A is a table illustrating correspondence between the detection results of the switches SW3 to SW5 of the sheet length detection sensor 817 and the sheet size (the user-set size) specified by the user. FIG. 5B is a table illustrating correspondence between the detection results of the switches SW0 to SW2 of the sheet width detection sensor 818 and the sheet size (the user-set size) specified by the user. The correspondence table illustrated in each of FIGS. 5A and 5B is stored in the ROM 202 or the RAM 203. The CPU 201 determines a sheet size error, based on information in this correspondence table.

The table in FIG. 5A illustrates a relationship between an automatic detection result regarding a length of a sheet in the feeding direction and a user-set size. The table in FIG. 5B illustrates a relationship between an automatic detection result regarding a length of a sheet in the widthwise direction and a user-set size.

The first column of the table illustrated in FIG. 5A indicates a sheet size length identified from the output state of each of the switches SW3 to SW5 of the sheet length detection sensor 817. The second to fourth columns of the table indicate the output states of the switches SW3 to SW5, respectively. The fifth and subsequent columns of the table each indicate a user-set size. In FIG. 5A, a portion (cell) indicated with "setting error" indicates that a sheet length set in a user-set size and an automatic detection result are determined to not match each other, i.e., it is determined that there is a setting error. In a case where it is determined that there is a setting error, the CPU 201 causes the operation unit 1003 to display a sheet size error screen illustrated in FIG. 6, thereby notifying the user of the setting error. A portion indicated with "o" indicates that a sheet length set in a user-set size and an automatic detection result are determined to match each other, i.e., it is determined that there is no setting error. In this case, the sheet size error screen is not displayed, and the user-set size is determined.

FIG. 5B illustrates a table of correspondence between a sheet size automatically detected based on a position of the trailing edge regulation guide 814 and a user-set size. The first column of the table indicates a range of sheet widths to be set. The second to fourth columns of the table indicates the output states of the switches SW0 to SW2 of the sheet width detection sensor 818, respectively. The fifth and subsequent columns of the table each indicate a user-set size. In FIG. 5B, a portion (cell) indicated with "setting error" indicates that a sheet width set in a user-set size and an automatic detection result are determined to not match each other, i.e., it is determined that there is a setting error. In a case where it is determined that there is a setting error, the CPU 201 causes the operation unit 1003 to display the sheet size error screen illustrated in FIG. 6, thereby notifying the user of the setting error. A portion indicated with "o" indicates that a sheet width set in a user-set size and an automatic detection result are determined to match each other, i.e., it is determined that there is no setting error.

In a case where a detection result indicates that the switch SW3 is OFF, the switch SW4 is ON, and the switch SW5 is ON, according to the table illustrated in FIG. 5A, the trailing edge regulation guide 814 is at a position that allows regulation of a sheet having a length of 190.5 mm to 221.5 mm in the feeding direction. In a case where a length in the feeding direction in a user-set size input in the sheet-size setting screen is 190.5 mm to 221.5 mm, the automatically detected sheet size and the user-set size correspond to each other. Therefore, the trailing edge regulation guide 814 is determined to be appropriately set and thus, a warning screen is not displayed. However, in a case where a size having a length longer than 221.5 mm in the feeding direction is specified as a user-set size in the sheet-size setting screen in FIG. 4B, this size does not match the automatically detected sheet size. Thus, the CPU 201 causes the operation unit 1003 to display the warning screen illustrated in FIG. 6. Displaying the warning screen illustrated in FIG. 6 can prevent occurrence of a feeding failure or a paper jam attributable to the trailing edge regulation guide 814 (or the side regulation guide 812) not being set in an appropriate position.

Case of Auxiliary Member being Installed

The trailing edge regulation guide 814 is configured to be slidable in a distance indicated with the arrows 8X1 and 8X2 illustrated in FIG. 3A. The trailing edge regulation guide 814 can support the trailing edge position of a sheet having a length of 190.5 mm to 355.6 mm. However, the slidable range of the trailing edge regulation guide 814 is limited, so that the trailing edge regulation guide 814 cannot support a sheet of a size smaller than this size, i.e., a sheet having a length of 148.0 mm to 190.5 mm or less. For example, in a case where an A5-size sheet having a sheet length of 148.0 mm or a long-type No. envelope is stored in the sheet feeding cassette, the trailing edge regulation guide 814 cannot regulate the trailing edge position of the sheet. In this way, in a case where a sheet of a size smaller than the sheet size supportable by the trailing edge regulation guide 814 is used, an auxiliary member 901 is attached to the trailing edge regulation guide 814 to regulate the sheet reliably in the present embodiment. The auxiliary member (attachment) 901 is used in a case where sheets of a size less than 190.5 mm are added to the sheet feeding cassette. The auxiliary member 901 is an attachment attachable to the sheet feeding cassette 120a and provided as an accessory of the sheet feeding cassette 120a. The auxiliary member 901 regulates the position of a sheet trailing edge at a position downstream of the trailing edge regulation guide 814 in the conveyance direction.

Figure 8A:
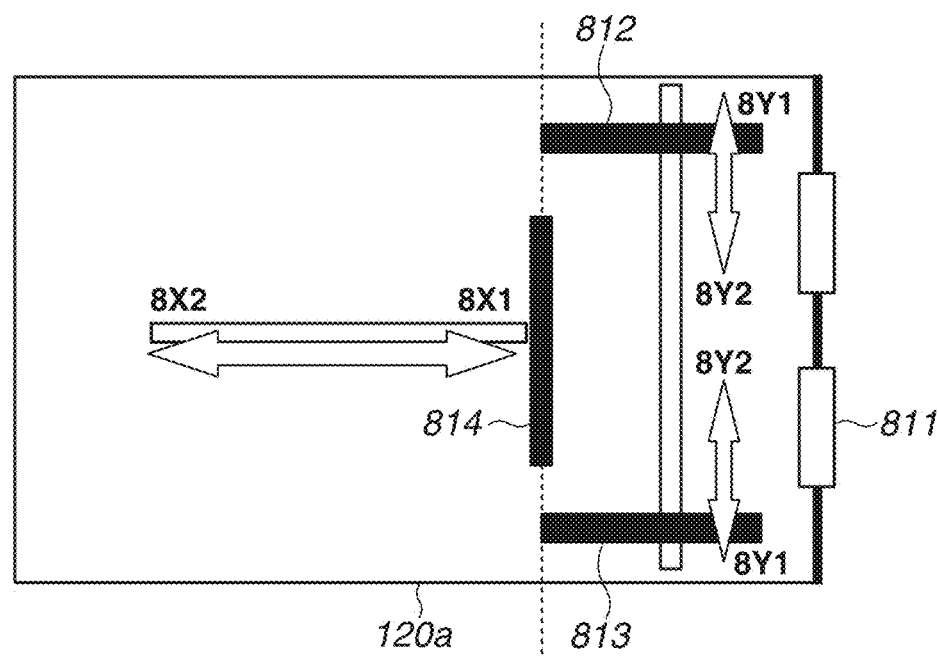
FIGS. 8A and 8B are schematic diagrams of the sheet feeding cassette to which an auxiliary member is attachable.
Figure 8B:
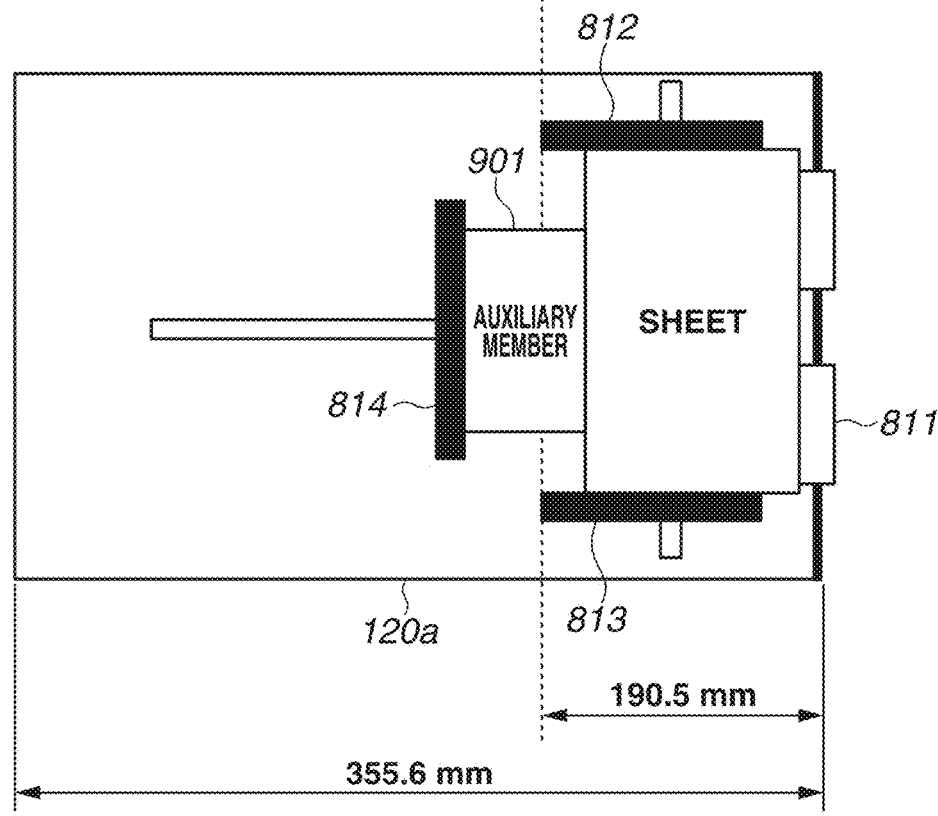

FIGS. 8A and 8B illustrates an example in which the auxiliary member 901 is attachable to the trailing edge regulation guide 814 in the sheet feeding cassette 120a. A dash line illustrated in FIGS. 8A and 8B indicates the minimum size position that allows sliding of the trailing edge regulation guide 814. Assumed here is a case where the auxiliary member 901 is attached to the trailing edge regulation guide 814 because sheets of a size (e.g., the A5 size of 148.0 mm) less than the minimum size for allowing sliding of the trailing edge regulation guide 814 are stacked in the sheet feeding cassette.

In a case where the auxiliary member 901 is installed, displaying a warning should not be avoided even if a sheet size (a user-set size) input by the user and a sheet size automatically detected from the position of the trailing edge regulation guide 814 do not match each other. Therefore, in the present embodiment, a warning is not to be displayed in a case where sheets are stored in a cassette in which the auxiliary member 901 is installed.

Flowchart Illustrating Processing for Performing Warning Display

Figure 7:
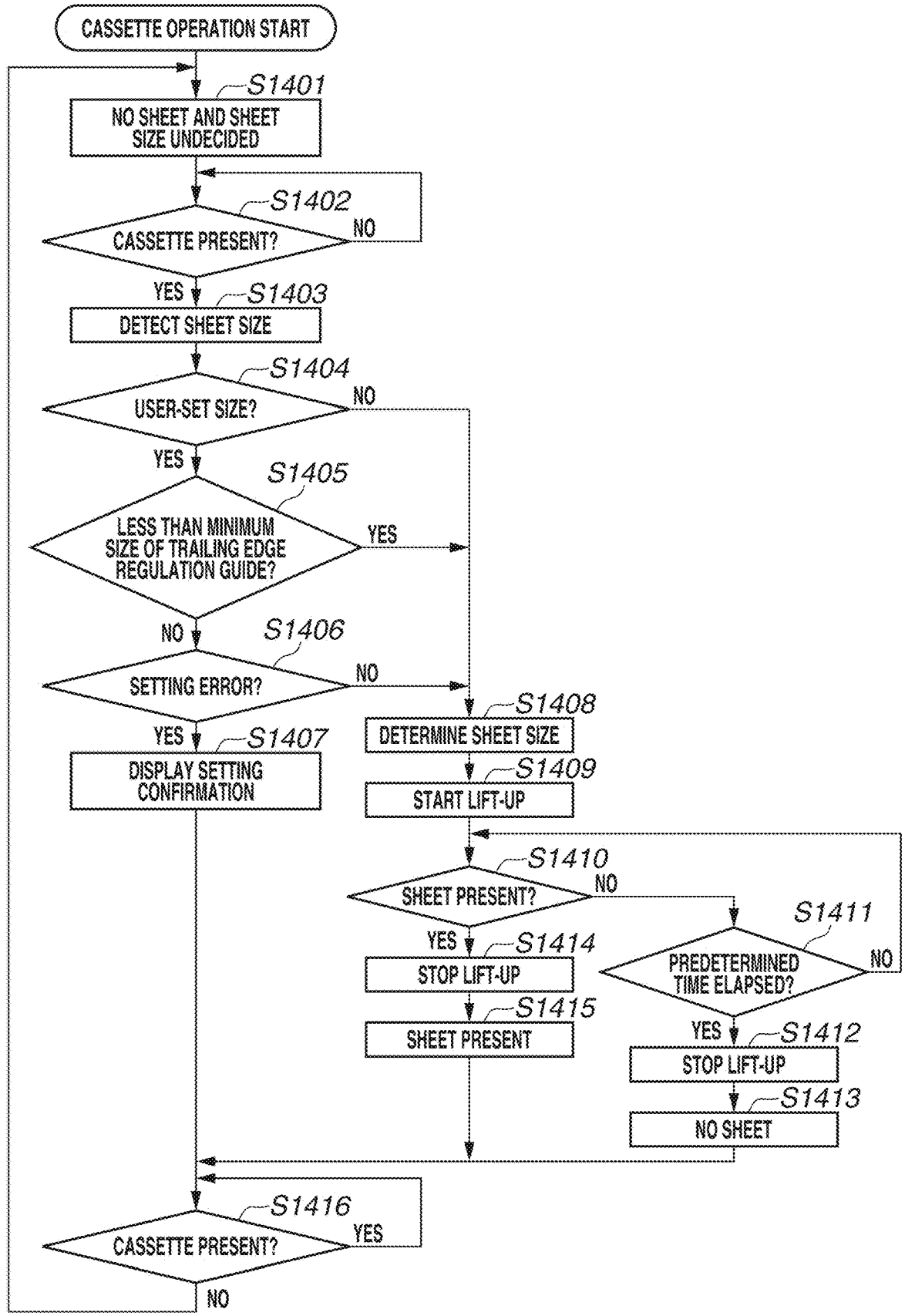
FIG. 7 is a flowchart illustrating an example of display of a warning screen based on a user-set size and an automatically detected sheet size.

FIG. 7 is a flowchart illustrating processing for performing warning display based on a result of determining a user-set size and an automatically detected size. The flowchart illustrated in FIG. 7 is executed when the image forming apparatus is powered on, when the sheet feeding cassette 120a is closed, and when a sheet size is set by the user. The CPU 201 executes each step in the flowchart illustrated in FIG. 7, according to the program stored in the ROM 202.

In step S1401, the CPU 201 initializes the information of the sheet feeding cassette 120a stored in the RAM 203 to "no sheet" and "sheet size undecided". Next, in step S1402, the CPU 201 determines whether the sheet feeding cassette 120a is attached in the main body 819, from a detection result of each of the switches SW0, SW1, and SW2 of the sheet width detection sensor 818, and the switches SW3, SW4, and SW5 of the sheet length detection sensor 817. In a case where all the switches SW0 to SW5 are OFF, the CPU 201 determines that the sheet feeding cassette 120a is not attached in the main body 819. On the other hand, in a case where any of the switches SW0 to SW5 is ON, the CPU 201 determines that the sheet feeding cassette 120a is attached. If the CPU 201 determines that the sheet feeding cassette 120a is attached (YES in step S1402), the processing proceeds to step S1403. In step S1403, the CPU 201 detects the size of a sheet based on the position of each of the trailing edge regulation guide 814 and the side regulation guide 812. This detection method is described above with reference to FIGS. 5A and 5B.

In step S1404, the CPU 201 determines whether a user-set size is set. Specifically, the CPU 201 determines that a user-set size is set, when a user-set size is set for the sheet feeding cassette 120a in the size setting screen in FIG. 4B. If the CPU 201 determines that a user-set size is set (YES in step S1404), the processing proceeds to step S1405. If the CPU 201 determines that a user-set size is not set (NO in step S1404), the processing proceeds to step S1408. If the CPU 201 determines that a user-set size is not set in step S1404, information of an automatically detected sheet size is directly set for the sheet feeding cassette 120a. In other words, in step S1408, a sheet size identified according to the detection of the position of each of the trailing edge regulation guide 814 and the side regulation guide 812 is determined as a sheet size of the sheet feeding cassette 120a.

In step S1405, the CPU 201 determines whether the length of the user-set size (the sheet length) in the feeding direction X is 148.0 mm to less than 190.5 mm. If the sheet size is within this range, this sheet has a size smaller than the size of a sheet supportable by the trailing edge regulation guide 814. Therefore, the auxiliary member 901 is placed between the trailing edge regulation guide 814 and the sheet. In the present embodiment, in a case where a sheet having a sheet length of 148.0 mm to less than 190.5 mm is input as the user-set size, processing in step S1408 is executed without execution of determination processing in step S1406. In other words, regardless of a match/nonmatch with the automatically detected sheet size, the user-set size is determined as the size information of the sheet feeding cassette 120a.

If the CPU 201 determines that the length of the user-set size (the sheet length) in the feeding direction X is longer than 190 mm (NO in step S1405), the processing proceeds to step S1406. In step S1406, the CPU 201 compares the user-set size with the automatically detected sheet size. Specifically, the CPU 201 makes a comparison between the length (the sheet length) of the user-set size in the feeding direction X and a position detection result of the trailing edge regulation guide 814, with reference to the table illustrated in FIG. 5A. Further, the CPU 201 makes a comparison between the length (the sheet width) of the user-set size in the widthwise direction Y and a position detection result of the side regulation guide 812, with reference to FIG. 5B. If the CPU 201 determines that a "setting error" has occurred in either the sheet length or the sheet width as the result of the comparison (YES in step S1406), the processing proceeds to step S1407. In step S1407, the CPU 201 causes the operation unit 1003 to display the warning screen illustrated in FIG. 6. The warning screen illustrated in FIG. 6 displays information for prompting a user to check whether the guide is set at a position corresponding to the sheet size, and information for prompting a user to check whether the user-set size matches the actual sheet size. At this time, the CPU 201 maintains the information of the sheet feeding cassette 120a in a state where the information has been initialized to no sheet and sheet size undecided in step S1401. Since the sheet feeding cassette 120a remains in the initialized state indicating no sheet, the image forming operation using the sheet feeding cassette 120a is not performed.

If the CPU 201 determines that the user-set size and the automatically detected sheet size match each other, i.e., there is no "setting error" (NO in step S1406), the processing proceeds to step S1408. In step S1408, the CPU 201 determines the user-set size or the automatically detected sheet size as the sheet size information of the sheet feeding cassette 120a.

In step S1409, the CPU 201 starts the lift-up operation for lifting the sheets stacked in the sheet feeding cassette 120a to the height that allows paper feeding. In step S1410, the CPU 201 determines whether a sheet is present, based on a detection result of the sheet presence sensor 820. If the CPU 201 determines that no sheet is present (NO in step S1410), the processing proceeds to step S1411. In step S1411, the CPU 201 determines whether a predetermined time has elapsed. If the CPU 201 determines that the predetermined time has not elapsed (NO in step S1411), the processing returns to step S1410. If the CPU 201 determines that the predetermined time has elapsed (YES in step S1411), this means that the sheet surface of the paper stacked in the sheet feeding cassette 120a cannot be detected by the sheet presence sensor 820 even if the predetermined time has elapsed. In this case, the processing proceeds to step S1412. In step S1412, the CPU 201 stops the lift-up operation. Then, in step S1413, the CPU 201 determines that no sheet is present in the sheet feeding cassette 120a. In step S1413, the CPU 201 changes the information of the sheet feeding cassette 120a initialized in step S1401, from "sheet size undecided" to "user-set size" or "automatically detected sheet size".

If the CPU 201 determines that a sheet is present (YES in step S1410), the processing proceeds to step S1414. In step S1414, the CPU 201 stops the lift-up operation. In step S1415, the CPU 201 replaces the information of the sheet feeding cassette 120a initialized in step S1401, with "user-set size" or "automatically detected sheet size". In other words, the CPU 201 stores the state of the sheet feeding cassette 120a into the RAM 203, as a state indicating a sheet being present and the user-set size or automatically detected sheet size. The CPU 201 then controls the image forming operation, based on the user-set size or the automatically detected sheet size.

In step S1416, the CPU 201 determines whether the sheet feeding cassette 120a is attached in the main body 819 (whether the sheet feeding cassette 120a is present). Based on the detection results of the sheet width detection sensor 818 and the sheet length detection sensor 817, if any of the switches SW0 to SW5 is ON, the CPU 201 determines that the sheet feeding cassette 120a is present (YES in step S1416). In this case, the processing in step S1416 is repeated. The CPU 201 thereby maintains the state of the sheet feeding cassette 120a determined in step S1403, while the presence of the sheet feeding cassette 120a is detected. Based on the detection results of the sheet width detection sensor 818 and the sheet length detection sensor 817, if all the switches SW0 to SW5 are OFF, the CPU 201 determines that the sheet feeding cassette 120a is not present (NO in step S1416). In this case, the processing returns to step S1401.

Here, the case where the CPU 201 determines that the sheet feeding cassette 120a is not present is, for example, a case where the sheet feeding cassette 120a is drawn from the main body 819 by the user according to an instruction of the screen illustrated in FIG. 6, in step S1407. Also applicable is, for example, a case where the sheets stacked in the sheet feeding cassette 120a are consumed by the image forming operation after step S1415, and the sheet feeding cassette 120a is drawn from the main body 819 by the user in response to the information indicating no sheet displayed on the operation unit 1003. Another possible case is a case where the empty sheet feeding cassette 120a is attached into the main body 819, after the processing in step S1413 in which it is determined that no sheet is present. In this way, if the CPU 201 determines that the sheet feeding cassette 120a is not present in step S1416, the processing returns to step S1401 to initialize the state of the sheet feeding cassette 120a to the state of no sheet and sheet size undecided. Subsequently, when the user adds sheets to the sheet feeding cassette 120a, and then attaches the sheet feeding cassette 120a into the main body 819, the CPU 201 determines that the sheet feeding cassette 120a is present in step S1402.

According to the present embodiment, in a case where the length (the sheet length) of the user-set size in the feeding direction is longer than a predetermined length, warning display corresponding to the position of the trailing edge regulation guide 814 is performed. Further, in a case where the length of the user-set size is shorter than the predetermined length, warning display corresponding to the position of the trailing edge regulation guide 814 is not performed. Therefore, in a case where the sheet length is a length that cannot be regulated by the trailing edge regulation guide 814, warning display is not performed assuming that the auxiliary member 901 is placed. Hence, warning display can be appropriately performed.

In the present embodiment, the minimum sheet length (190.5 mm) regulatable by the trailing edge regulation guide 814 is described as an example of the predetermined length. However, other reference value may be used as the predetermined length. For example, a length to be determined based on the size of the auxiliary member 901 provided as an accessory may be used as the predetermined length.

Further, in the present embodiment, as examples of the warning display, the example of displaying the information for prompting a user to check whether the guide is set at a position corresponding to the sheet size and the example of displaying the information for prompting a user to check whether the user-set size matches the actual sheet size of sheets added to the cassette are described. However, contents of the warning display are not limited to these examples. For example, a warning for notifying only a sheet setting error may be displayed.

In the present embodiment, the case where the auxiliary member 901 is placed between the trailing edge regulation guide 814 and the sheet is described. However, the position where the auxiliary member is attached is not limited to the case. For example, the auxiliary member may be placed between the side regulation guide 812 and the sheet. In this case, the following processing is performed in step S1404 illustrated in FIG. 7. In step S1404, the CPU 201 determines whether the length (the sheet width) of the user-set size in the widthwise direction Y is smaller than a predetermined width. If the CPU 201 determines that the length (the sheet width) is smaller than the predetermined width, warning display corresponding to the detection of the position of the side regulation guide 812 is not performed. The value of the predetermined width in this process may be determined based on the minimum sheet width regulatable by the side regulation guide 812. Taking the configuration of the sheet feeding cassette 120a in the present embodiment as an example, the position of the side edge of a sheet can be regulated by the side regulation guide 812 if the sheet has a sheet width of 98.3 mm. Therefore, in a case where a sheet width less than 98.3 mm is specified as a user-set size, the above-described warning display is not performed.

A second embodiment will be described below. In the example described in the first embodiment, when the sheet length of the user-set size is determined to be shorter than the predetermined length, the warning screen is not displayed even if the sheet width of the user-set size is different from the automatic detection result. In contrast, in an example to be described in the second embodiment, when the sheet width of a user-set size is different from an automatic detection result, warning display is performed regardless of whether the sheet length of the user-set size is longer or shorter than a predetermined length.

Figure 9:
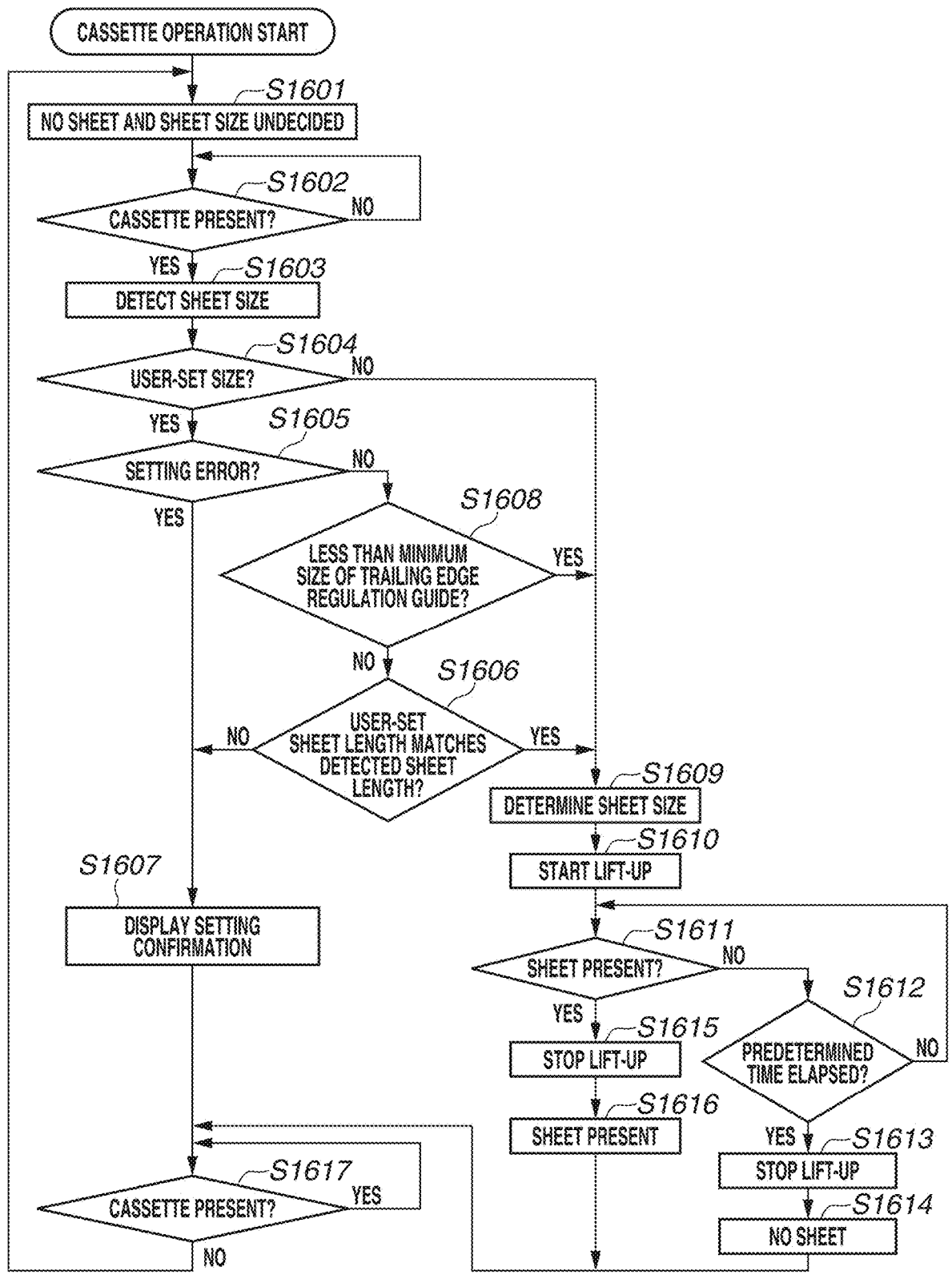
FIG. 9 is a flowchart illustrating an example of display of a warning screen based on a user-set size and an automatically detected sheet size according to a second embodiment.

FIG. 9 is a flowchart illustrating processing for performing warning display in the second embodiment. Processes in step S1601, step S1602 and step 1609 to step 1617 are similar to those in step S1401, step S1402 and step S1408 to step S1416, respectively, which are illustrated in FIG. 7 and described in the first embodiment. Therefore, step S1601, step S1602 and step 1609 to step 1617 will not be described.

In step S1603, the CPU 201 detects the sheet length illustrated in FIG. 5A based on the detection result of the sheet length detection sensor 817 (the switches SW3 to SW5). The CPU 201 also detects the sheet width illustrated in FIG. 5B based on the detection result of the sheet width detection sensor 818 (the switches SW0 to SW2).

In step S1604, the CPU 201 determines whether the user-set size is set. If the user-set size is set (YES in step S1604), the processing proceeds to step S1605. If the user-set size is not set (NO in step S1604), the processing proceeds to step S1609. In step S1605, the CPU 201 determines a match/nonmatch between the sheet width set in the user-set size and the sheet width detected in step S1603 (i.e., whether there is a setting error), with reference to the table illustrated in FIG. 5B. If the CPU 201 determines a nonmatch in step S1605, i.e., if the CPU 201 determines that there is a setting error (YES in step S1605), the processing proceeds to step S1607. In step S1607, the CPU 201 causes the display unit to display the warning display screen illustrated in FIG. 6. If the CPU 201 determines a match in step S1605, i.e., if the CPU 201 determines that there is no setting error (NO in step S1605), the processing proceeds to step S1608. In step S1608, the CPU 201 determines whether the sheet length of the user-set size is less than a minimum size that allows sliding of the trailing edge regulation guide 814. If the CPU 201 determines that the sheet length is less than the minimum size (YES in step S1608), the processing proceeds to step S1609.

On the other hand, if the CPU 201 determines a match (no setting error) in step S1605, and then determines that the sheet length is not less than the minimum size (NO in step S1608), the processing proceeds to step S1606. In step S1606, the CPU 201 determines whether the sheet length set in the user-set size and the detected sheet length match each other, with reference to the table illustrated in FIG. 5A. If the CPU 201 determines a mismatch, (YES in step S1606), the processing proceeds to step S1607. If the CPU 201 determines a match, (NO in step S1606), the processing proceeds to step S1609. In step S1609, the CPU 201 determines the user-set size or the automatically detected sheet size, as the sheet size information of the sheet feeding cassette 120a.

As described above, according to the second embodiment, when the sheet width of the user-set size is different from the automatic detection result, the warning display is performed regardless of whether the sheet length of the user-set size is shorter than the predetermined length.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2017-154455, filed Aug. 9, 2017, which is hereby incorporated by reference herein in its entirety.

What is claimed is:

1. An image forming apparatus comprising:
a storage unit configured to store a sheet;
an image forming unit configured to form an image on a sheet fed from the storage unit;
a trailing edge regulation member provided in the storage unit, wherein the trailing edge regulation member is slidable in a feeding direction of a sheet and configured to regulate a position of a trailing edge of the sheet in the feeding direction;
an attachment configured to be attached to the trailing edge regulation member, wherein the attachment is configured to regulate a position of a trailing edge of a sheet at a position downstream of the trailing edge regulation member in the feeding direction;
a detection unit configured to detect a size of a sheet stored in the storage unit based on a position of the trailing edge regulation member;
an input unit configured to input a size of a sheet to be set for the storage unit based on a user instruction; and
a control unit configured to perform a first determination process to determine whether the size of the sheet input by the input unit corresponds to the size of the sheet detected by the detection unit and perform a second determination process to determine whether a length in the feeding direction in the size of the sheet input by the input unit is longer or shorter than a predetermined length,
wherein, in a case where the control unit determines in the second determination process that the length in the feeding direction in the size of the sheet input by the input unit is longer than the predetermined length, the control unit performs control to display on a display unit a warning screen based on a result of the first determination process, and
wherein, in a case where the control unit determines in the second determination process that the length in the feeding direction in the size of the sheet input by the input unit is shorter than the predetermined length, the control unit performs control to prevent display on the display unit of the warning screen based on a result of the first determination process.

2. The image forming apparatus according to claim 1, wherein the predetermined length is shorter than a length of a sheet in the feeding direction, which is regulatable by the trailing edge regulation member.

3. The image forming apparatus according to claim 1, wherein the warning screen is a warning screen for notifying that the size of the sheet input by the input unit and the size of the sheet detected by the detection unit do not correspond to each other.

4. The image forming apparatus according to claim 1, wherein the warning screen is a warning screen for promoting adjustment of the position of the trailing edge regulation member.

5. The image forming apparatus according to claim 1, wherein a size of a nonstandard-size sheet is input by the input unit.

6. The image forming apparatus according to claim 1, further comprising a side regulation guide configured to be slidable in a widthwise direction orthogonal to the feeding direction, and configured to regulate a side edge of the sheet in the widthwise direction,
wherein, based on the position of the trailing edge regulation member and a position of the side regulation guide, the detection unit detects the size of the sheet.

7. The image forming apparatus according to claim 1, wherein the storage unit is a sheet feeding cassette.

8. The image forming apparatus according to claim 1, wherein the control unit does not perform the second determination in a case where the length of the sheet in the feeding direction in size information input by the input unit is smaller than the predetermined length.

9. The image forming apparatus according to claim 1, wherein the control unit prohibits image formation on a sheet fed from the storage unit, until the control unit determines that the length in the feeding direction in the size of the sheet input by the input unit and a length in the feeding direction in the size of the sheet detected by the detection unit correspond to each other.

10. A method for an image forming apparatus having a storage unit configured to store a sheet, an image forming unit configured to form an image on a sheet fed from the storage unit, a trailing edge regulation member provided in the storage unit, wherein the trailing edge regulation member is slidable in a feeding direction of a sheet and configured to regulate a position of a trailing edge of the sheet in the feeding direction, and an attachment configured to be attached to the trailing edge regulation member, wherein the attachment is configured to regulate a position of a trailing edge of a sheet at a position downstream of the trailing edge regulation member in the feeding direction, the method comprising:
detecting a size of a sheet stored in the storage unit based on a position of the trailing edge regulation member;
inputting a size of a sheet to be set for the storage unit based on a user instruction; and
performing a first determination process to determine whether the input size of the sheet corresponds to the detected size of the sheet and performing a second determination process to determine whether a length in the feeding direction in the input size of the sheet is longer or shorter than a predetermined length,
wherein, in a case where it is determined in the second determination process that the length in the feeding direction in the input size of the sheet is longer than the predetermined length, performing includes performing control to display on a display unit a warning screen based on a result of the first determination process, and
wherein, in a case where it is determined in the second determination process that the length in the feeding direction in the input size of the sheet is shorter than the predetermined length, performing includes performing control to prevent display on the display unit of the warning screen based on a result of the first determination process.

* * * * *